(12) United States Patent
Albrecht (10) Patent No.: US 8,558,139 B2
(45) Date of Patent: Oct. 15, 2013

(54) HYBRID WELDING SYSTEMS AND DEVICES (71) Applicant: Illinois Tool Works Inc., Glenview, IL (US)

(72) Inventor: Bruce Patrick Albrecht, Neenah, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 13/631,947

(22) Filed: Sep. 29, 2012

(65) Prior Publication Data

US 2013/0020299 A1    Jan. 24, 2013

Related U.S. Application Data (62) Division of application No. 12/776,298, filed on May 7, 2010, now Pat. No. 8,405,001.

(60) Provisional application No. 61/225,030, filed on Jul. 13, 2009.

(51) Int. Cl.
*B23K 9/10* (2006.01)

(52) U.S. Cl.
USPC .................... 219/130.1; 219/133; 219/130.21; 219/108; 219/130.4; 219/137 PS (58) Field of Classification Search
USPC ............. 219/130.1, 133, 130.21, 108, 130.4, 219/137 PS
See application file for complete search history.

(56) References Cited

U.S. PATENT DOCUMENTS

| | | | |
|---|---|---|---|
| 4,705,934 A | 11/1987 | Winkler | |
| 5,250,786 A | 10/1993 | Kikuchi | |
| 6,175,217 B1 * | 1/2001 | Da Ponte et al. | 322/19 |
| 6,331,694 B1 | 12/2001 | Blankenship | |
| 6,389,697 B1 | 5/2002 | Benoit | |
| 6,512,201 B2 | 1/2003 | Blankenship | |
| 6,555,928 B1 | 4/2003 | Mizuno | |
| 6,653,596 B2 | 11/2003 | Blankenship | |
| 6,747,246 B2 * | 6/2004 | Crandell, III | 219/130.1 |
| 6,777,649 B2 | 8/2004 | Reynolds | |
| 6,779,550 B1 | 8/2004 | Bennett | |
| 6,979,913 B2 * | 12/2005 | Storm et al. | 290/17 |
| 6,982,398 B2 | 1/2006 | Albrecht | |
| 6,992,265 B2 | 1/2006 | Bender | |
| 7,105,774 B2 | 9/2006 | Bender | |
| 7,148,444 B2 | 12/2006 | Beisswenger | |
| 7,156,277 B2 | 1/2007 | Ishikawa | |
| 7,183,517 B2 | 2/2007 | Albrecht | |
| 7,188,645 B2 | 3/2007 | Bender | |
| 7,487,807 B2 | 2/2009 | Bender | |
| 7,615,719 B2 | 11/2009 | Shipulski | |
| 7,642,487 B2 | 1/2010 | Silvestro | |
| D611,074 S | 3/2010 | Bashore | |
| 7,673,786 B2 | 3/2010 | Menotti | |

(Continued)

*Primary Examiner* — Viet Q Nguyen
(74) *Attorney, Agent, or Firm* — Fletcher Yoder, P.C.

(57) ABSTRACT

A hybrid welding device including a fuel cell and an energy storage device that cooperate to power a welding operation and/or an auxiliary operation are provided. In some embodiments, the hybrid welding device may also include an engine coupled to a generator that is configured to supplement the power provided by the fuel cell and/or the energy storage device. The hybrid welding device may be adapted to provide power for a welding operation and/or an auxiliary operation when operated as a standalone unit and/or when connected to a primary source of utility power.

7 Claims, 5 Drawing Sheets

(56) References Cited

U.S. PATENT DOCUMENTS

| | | | |
|---|---|---|---|
| 7,687,937 B2 * | 3/2010 | Lasseter et al. | 307/69 |
| 7,748,416 B2 | 7/2010 | Bender | |
| 7,777,447 B2 | 8/2010 | Vogel | |
| 7,795,840 B2 | 9/2010 | Vogel | |
| 7,838,797 B2 * | 11/2010 | Albrecht | 219/133 |
| 7,858,895 B2 * | 12/2010 | Moore | 219/98 |
| 7,868,269 B2 | 1/2011 | Silvestro | |
| 8,080,761 B2 | 12/2011 | Matthews | |
| 8,089,027 B2 | 1/2012 | Newman | |
| 8,304,682 B2 * | 11/2012 | Fisk | 219/108 |
| 2007/0181547 A1 | 8/2007 | Vogel | |
| 2007/0187376 A1 | 8/2007 | Albrecht | |
| 2007/0215585 A1 | 9/2007 | O'Connor | |
| 2008/0314885 A1 | 12/2008 | Hutchison | |
| 2009/0057285 A1 | 3/2009 | Bashore | |
| 2009/0089536 A1 | 4/2009 | Norman | |
| 2010/0096373 A1 | 4/2010 | Hillen | |
| 2010/0155384 A1 | 6/2010 | Albrecht | |
| 2010/0176109 A1 | 7/2010 | Peters | |
| 2010/0187210 A1 | 7/2010 | Albrecht | |
| 2010/0314181 A1 | 12/2010 | Beeson | |
| 2010/0314362 A1 | 12/2010 | Albrecht | |
| 2010/0314373 A1 | 12/2010 | Kaufman | |
| 2010/0320183 A1 | 12/2010 | Borchert | |
| 2011/0006046 A1 | 1/2011 | Albrecht | |
| 2011/0114607 A1 | 5/2011 | Albrecht | |
| 2011/0114608 A1 | 5/2011 | Albrecht | |
| 2011/0180522 A1 | 7/2011 | Bunker | |
| 2011/0297658 A1 | 12/2011 | Peters | |
| 2012/0006792 A1 | 1/2012 | Rozmarynowski | |
| 2012/0074116 A1 | 3/2012 | Matthews | |
| 2012/0241430 A1 | 9/2012 | Luck | |

* cited by examiner

HYBRID WELDING SYSTEMS AND DEVICES

CROSS REFERENCE TO RELATED APPLICATIONS

This application claims priority of U.S. Provisional Patent Application No. 61/225,030, entitled "Weld Parameter Tracking on a Pipe Line or Other Structure", filed Jul. 13, 2009, which is herein incorporated by reference; and a divisional of Ser. No. 12/776,298, filed May 7, 2010, entitled "Hybrid Welding Systems and Devices" in the name of Bruce Patrick Albrecht.

BACKGROUND

The invention relates generally to welding systems, and, more particularly, to hybrid welding systems.

Welding is a process that has become increasingly ubiquitous in various industries and applications. As such, a variety of welding applications, such as in construction and shipbuilding, may require welding devices that are portable and can easily be transported to a remote welding location. Accordingly, it is often desirable for such welding devices to be operable as standalone units remote from a power grid or other primary power source. Therefore, a variety of welding systems utilizing alternate power sources, such as batteries, have been developed. Unfortunately, such systems often operate inefficiently and are substantially limited in the type of conditioned power outputs that may be provided. Additionally, such systems are often costly and have difficulty efficiently accommodating the fluctuating load demands of welding systems. Accordingly, there exists a need for welding systems that overcome such drawbacks.

BRIEF DESCRIPTION

In an exemplary embodiment, a hybrid welding device includes a fuel cell adapted to consume a fuel source to generate power for a welding operation. The hybrid welding device also includes an energy storage device adapted to discharge a supply of stored energy to provide power for the welding operation. The hybrid welding device also includes power conversion circuitry coupled to at least one of the fuel cell and the energy storage device. The power conversion circuitry is adapted to receive the power from the fuel cell, to receive the power from the energy storage device, and to convert the received power to an output suitable for use in the welding operation.

In another embodiment, a hybrid welding device includes a fuel cell adapted to consume a fuel source to generate a first power output. The hybrid welding device also includes an energy storage device adapted to discharge a supply of stored energy to provide a second power output. The hybrid welding device also includes power conversion circuitry coupled to at least one of the fuel cell and the energy storage device. The power conversion circuitry is adapted to receive the first and second power outputs and to convert the power outputs to a welding power output and an auxiliary power output.

In another embodiment, a hybrid welding device includes a fuel cell adapted to consume a fuel source to generate a first power output. The hybrid welding device also includes an energy storage device adapted to discharge a supply of stored energy to provide a second power output. The hybrid welding device also includes power conversion circuitry adapted to receive the first power output and the second power output and to convert the first power output and the second power output to a third power output for a welding operation. The hybrid welding device also includes control circuitry adapted to monitor a power output demand level of the hybrid welding device and to regulate the third power output for the welding operation based on the power output demand level.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As described in detail below, embodiments of a hybrid welding device are provided that include at least a fuel cell and an energy storage device that cooperate to power a welding operation. In some embodiments, the hybrid welding device may also include an engine coupled to a generator that is configured to supplement the power provided by the fuel cell and/or the energy storage device. As such, the hybrid welding device may be configured to provide power for a welding operation when operated as a standalone unit and/or when connected to a primary source of utility power. However, in some embodiments, the hybrid welding device may be configured to generate power when isolated from electrical outlets, such as in a remote work location. In certain embodiments, the fuel cell and the energy storage device may be adapted to coordinate operation such that the fuel cell supplies a constant output at all times, and the energy storage device either supplements the fuel cell output with additional power or utilizes excess power from the fuel cell to recharge.

The hybrid welding device may also include power conversion circuitry configured to receive power from at least one of the engine-generator, the fuel cell, the energy storage device, and the utility power grid. The power conversion circuitry may be adapted to receive such input power, to condition the received power, and to output an appropriate level (and type) of power for the welding operation. For example, the power conversion circuitry may include a weld power converter configured to generate a weld power output that may be utilized by a welding torch to power the welding arc. For further example, the power conversion circuitry may also include an auxiliary power converter configured to receive input power from one or more of the power sources and to produce a power output suitable for use by one or more auxiliary devices. The operation of such power conversion circuitry may be controlled by control circuitry that receives inputs from an operator interface regarding the power outputs desired by the user.

Figure 1:
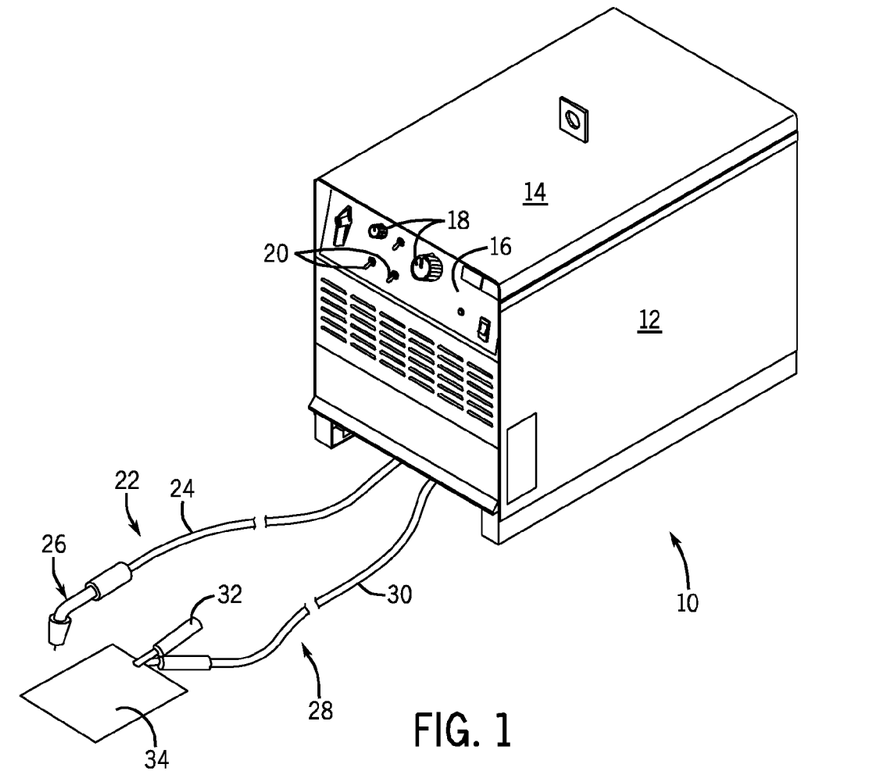
FIG. 1 is a perspective view of an exemplary hybrid welding device in accordance with aspects of the present invention.

Turning now to the drawings, FIG. 1 is a perspective view of an exemplary hybrid welding system 10, which functions to power, control and provide consumables to a welding operation and/or auxiliary equipment. The hybrid welding system 10 includes a hybrid power supply 12 based in a cabinet or enclosure 14. In some embodiments, the hybrid welding system may be configured to permit the power supply to be moved from place to place relatively easily, or may be designed as a generally stationary system. Moreover, the system may be designed for field operation, in which case it may include at least one of an engine-generator unit, a fuel cell, and an energy storage device within the enclosure 14 that provide the necessary power, conditioned appropriately for the given welding operation. Embodiments of the hybrid welding system 10 may be designed for use in close proximity to one or more sources of utility power or remote from such sources. As such, in some embodiments, the hybrid power supply unit 12 may be communicatively coupled to additional system components, such as a wall power outlet, a battery, engine-driven power sources, and so forth. In other embodiments, however, the hybrid welding power source 12 may be adapted to operate as a standalone unit, generating the power necessary for a welding operation and/or auxiliary operations while isolated from additional power sources.

The hybrid power supply 12 includes a control panel 16, through which a user may control the supply of materials, such as power, shielding gas, and so forth, to a welding operation, via dials 18, switches 20, and so forth. As the user adjusts welding parameters via the control panel 16, signals are generated and received by a controller within the hybrid welding power supply 12. The hybrid power supply 12 controller implements the desired welding operation in accordance with these inputs. For instance, in one embodiment, the controller may implement a constant voltage regime and a wire feed suitable for use with a MIG welding operation.

An electrode assembly 22 extends from the hybrid power supply 12 to the location of the weld. A first cable 24 and a welding electrode 26 couple to the power supply unit 12 as components of the electrode assembly 22. The electrode 26 may be any electrode suitable for a variety of welding processes. For instance, the electrode 26 may be provided in a torch suitable for metal inert gas (MIG) operations, a stinger suitable for stick welding operations, and so forth. A work assembly 28 extending from the power supply 12 to the weld includes a second cable 30 terminating in a work lead clamp 32. During operation, the work lead clamp 32 typically connects to a workpiece 34 to close the circuit between the electrode 26, the workpiece 34, and the hybrid power supply 12, thus ensuring proper current flow. That is, as the welding operator contacts or closely approaches the tip of the electrode 26 to the workpiece 34, an electrical circuit is completed through the cables 24 and 30, the electrode 26, the workpiece 34, and the clamp 32 to generate an arc between the electrode tip and the workpiece 34.

Figure 2:
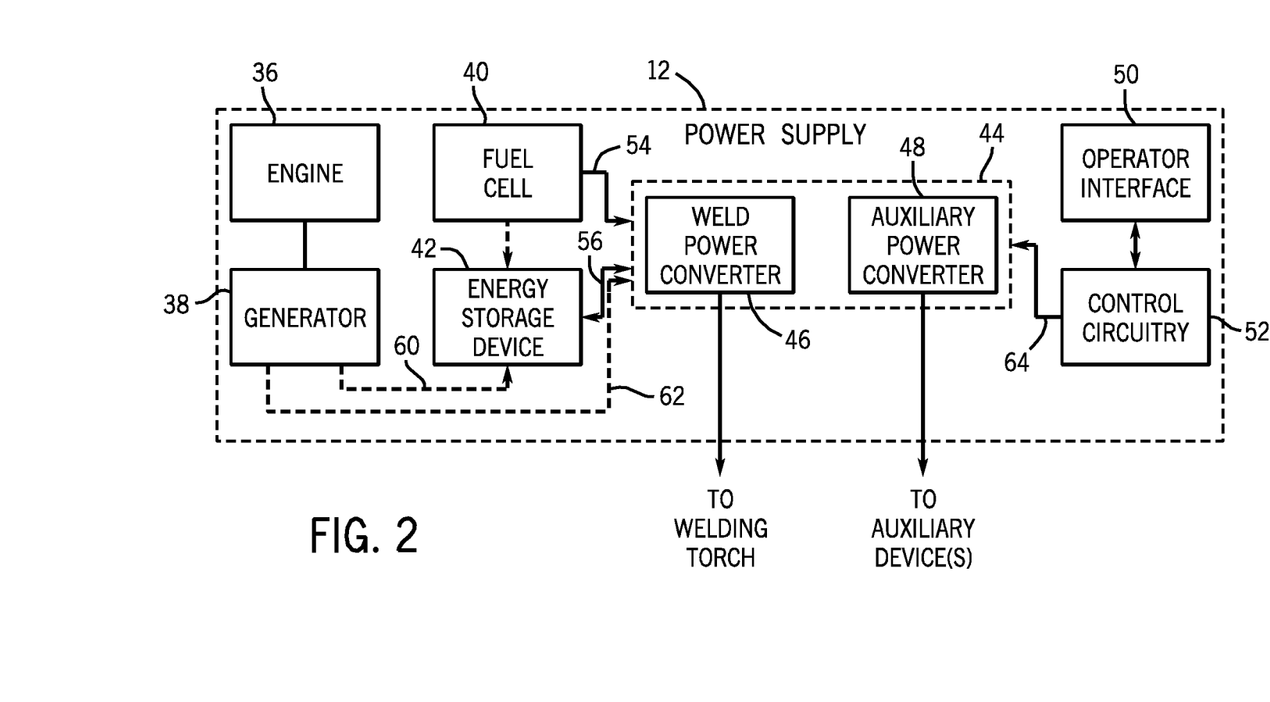
FIG. 2 is a block diagram illustrating an exemplary configuration of a fuel cell, an energy storage device, and an engine-generator unit disposed within an embodiment of the hybrid welding device of FIG. 1.

FIG. 2 is a block diagram illustrating exemplary internal components of the hybrid power supply 12 of FIG. 1. In this embodiment, the hybrid power supply 12 includes a variety of power sources, such as an engine 36, a generator 38, a fuel cell 40, and an energy storage device 42. However, in other embodiments, the hybrid power supply 12 may include at least one of the fuel cell 40, the generator 38, and the energy storage device 42. Indeed, the hybrid power supply 12 may include any combination of the power sources illustrated in FIG. 2. The hybrid power supply 12 also includes power conversion circuitry 44 including a weld power converter 46 and an auxiliary power converter 48. The hybrid power supply 12 also includes an operator interface 50 and control circuitry 52. It should be noted that additional components, such as electrical components, blowers, fans, and so forth, not shown in FIG. 2 may be included in the hybrid power supply 12 in further embodiments. Furthermore, although the term hybrid "welding" power supply is used herein, the hybrid power supply 12 may be any power supply suitable for use in any welding, cutting, or heating application, such as a plasma cutter for use in a plasma cutting operation.

The fuel cell 40 may be any electrochemical cell configured to utilize a fuel source to generate power by consuming the source. For example, the fuel cell 40 may be a hydrogen fuel cell that is configured to utilize hydrogen as the fuel and oxygen as the oxidant. The fuel cell 40 may also be a proton exchange membrane fuel cell including a polymer membrane configured to conduct protons, thereby acting as the electrolyte, and disposed between the anode and the cathode of the fuel cell. Still further, the fuel cell may be a solid oxide fuel cell, a molten carbonate fuel cell, a regenerative fuel cell, an enzymatic biofuel cell, a metal hydride fuel cell, or any other suitable type of fuel cell. Similarly, the energy storage device 42 may be any device configured to selectively discharge energy and utilize energy to recharge. For example, the energy storage device may be a capacitor or a series of capacitors. For further example, the energy storage device 42 may be any of a variety of types of batteries, such as high purity lead acid batteries, lithium ion batteries, lithium polymer batteries, and so forth.

During operation, the engine 36, the generator 38, the fuel cell 40, and the energy storage device 42 are adapted to provide the power conversion circuitry 44 with primary power. For example, in the illustrated embodiment, the fuel cell 40 outputs power directly to the power conversion circuitry 44, as indicated by arrow 54. The energy storage device both outputs power directly to the power conversion circuitry 44 as well as receives power from the power conversion circuitry, as indicated by arrow 56. That is, the energy storage device 42 may discharge to meet the demands of the system when energy needs are high and recharge when excess power exists in the system. A variety of alternate power flows that may be employed in some embodiments are indicated by dashed lines in FIG. 2. For instance, in further embodiments, the fuel cell 40 may be configured to transfer power directly to the energy storage device 42 for recharging when the power demand of the system is low, as indicated by arrow 58. Still further, the generator 38 may output energy directly to the energy storage device 42 for recharging or for subsequent transfer to the power conversion circuitry 44, as indicated by arrow 60. Additionally, the generator 38 may output power directly to the power conversion circuitry 44 to power the weld operation or an auxiliary device, as indicated by arrow 62. As such, the engine 36, the generator 38, the fuel cell 40, and the energy storage device 42 may cooperate to ensure that the power demands of the welding system are met and that the energy storage device 42 is recharged when appropriate based on system demands.

The power conversion circuitry 44 is configured to receive the one or more power inputs and to convert such inputs to the amount and type of power needed by the welding system. To that end, the power conversion circuitry includes the weld power converter 46, which is operable to condition power for use by the welding torch, and the auxiliary power converter 48, which is adapted to condition power for use by one or more auxiliary devices. For example, the weld power converter 46 may condition power for use in a MIG welding process, a pulse MIG welding process, a TIG welding process, a stick welding process, a modified short circuit process, a flux cored arc welding (FCAW) process, a FCAW-SS process, a plasma welding process, a plasma cutting process, an induction heating process, and so forth. For further example, the auxiliary power converter 48 may condition power to output 115V, 120V, 200V, 240V, 400V, 460V, or any other appropriate power output for devices such as hand grinders, lights, and so forth. As such, the power conversion circuitry may include suitable electrical components defining one or more of an inverter, a boost converter, a buck converter, a buck-boost converter, a boost-buck converter, and so forth.

The control circuitry 52 interfaces with the power conversion circuitry 44, as indicated by arrow 64, to control the output of power to the welding torch and/or one or more auxiliary devices. For instance, the control circuitry 52 may be configured to detect an auxiliary power demand and direct the auxiliary power converter 48 to output power to meet such a demand. Additionally, the control circuitry 52 may receive instructions regarding the desired type of welding process, current level desired, voltage level desired, and so forth from the operator interface 50.

Figure 3:
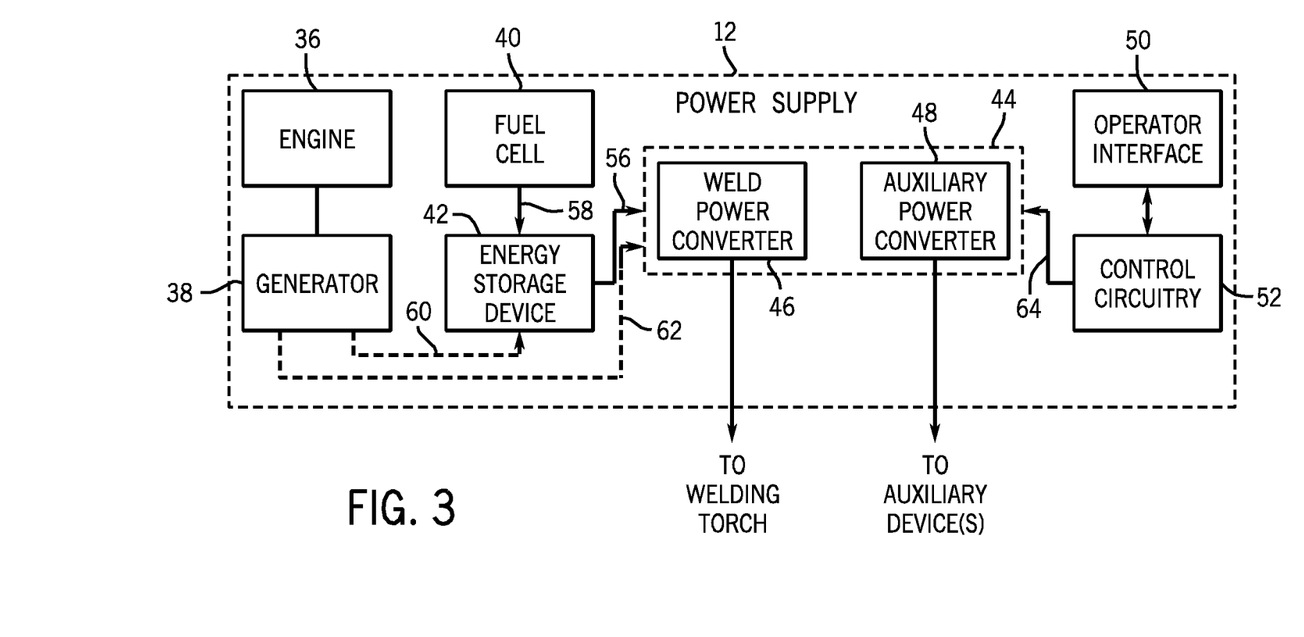
FIG. 3 is a block diagram illustrating an exemplary configuration of a fuel cell coupled to an energy storage device and disposed within an embodiment of the hybrid welding device of FIG. 1.

FIG. 3 is a block diagram illustrating exemplary components of an alternate embodiment of the hybrid power supply 12 of FIG. 1. As before, the hybrid power supply 12 includes the fuel cell 40, the energy storage device 42, the engine 36, and the generator 38, which cooperate to provide power to the power conversion circuitry 44. However, in this embodiment, the fuel cell 40 is adapted to provide power exclusively to the energy storage device 42 for further transmission to the power conversion circuitry 44. That is, in this embodiment, the energy storage device 42 is configured to function as an intermediate between the fuel cell 40 and the power conversion circuitry 44. As such, the fuel cell 40 power output may be utilized by the energy storage device 42 to recharge the device 42 when the power demand of the system is low or to power the welding operation and/or an auxiliary operation when the power demand of the system is high. Additionally, the energy storage device 42 may be configured to supplement the power received from the fuel cell 40 when the desired power output of the system exceeds the amount of power received from the fuel cell 40.

As before, the engine 36 is configured to drive the generator 38 to produce power that may also be utilized by the energy storage device 42 and/or the power conversion circuitry 44. That is, the generator 38 may output power to the energy storage device 42 that may be utilized to supplement the power provided from the fuel cell 40 to meet the system demands. In other embodiments, however, the generator 38 may output power directly to the power conversion circuitry 44. Indeed, a variety of combinations of the various power sources may be utilized to meet the demands of the system. For example, in one embodiment, the fuel cell 40 may be configured to continuously output a constant amount of power. When such a power level is too low to meet the power demands of the system, the energy storage device 42 and/or the generator 38 may supplement the fuel cell power in a variety of different ways. For example, as described in more detail below, the energy storage device 42 may supplement the fuel cell power until the energy storage device 42 is fully discharged, at which point the generator 38 may begin supplying the additional power needed. Indeed, any combination of the power from any of the available fuel sources may be employed.

Figure 4:
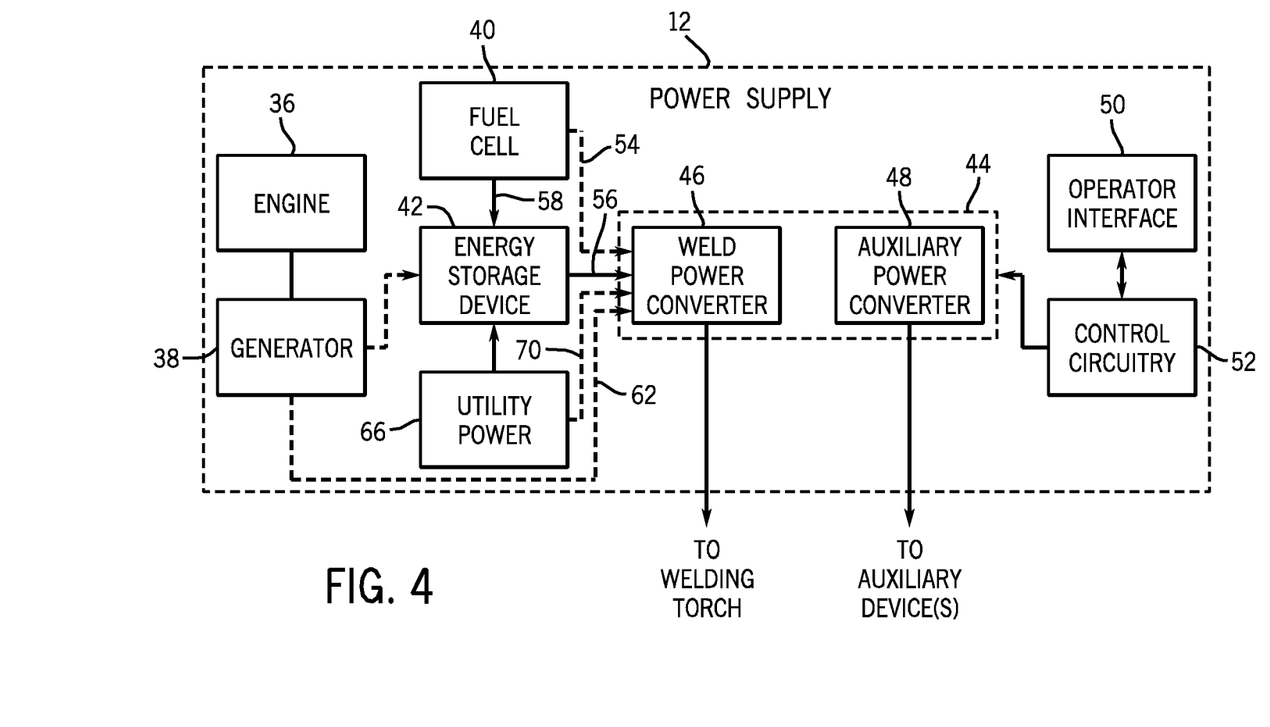
FIG. 4 is a block diagram illustrating an exemplary configuration of a fuel cell, an energy storage device, an engine-generator unit, and a utility power source in an alternative embodiment of the hybrid welding device of FIG. 1.

FIG. 4 is a block diagram illustrating exemplary components of an alternate embodiment of the hybrid power supply 12 of FIG. 1. In this embodiment, as before, the power supply 12 includes the fuel cell 40, the energy storage device 42, the engine 36, and the generator 38 that are configured as power sources for the welding operation and/or the auxiliary operation. However, in the embodiment of FIG. 4, the hybrid power supply 12 also includes utility power 66 as a power source for supporting the weld operations. As such, the utility power 66 may be adapted to provide power to the power conversion circuitry via the energy storage device 42, as indicated by arrow 68. Alternatively, the utility power 66 may be configured to supply power directly to the power conversion circuitry 44, as indicated by arrow 70. The utility power 66 may be any of a variety of suitable primary power sources, such as a power grid or a wall outlet. Accordingly, the utility power 66 may be located external to the hybrid power supply 12 and connected to the power supply 12 via a cable or conduit in some embodiments.

As shown, the generator 38 may be configured to provide power directly to the power conversion circuitry 44, as indicated by arrow 62, or to the energy storage device 42 for charging of the device 42 or subsequent transfer to the power conversion circuitry 44. Similarly, the fuel cell 40 may be configured to input power directly to the power conversion circuitry 44, as indicated by arrow 54, or to the energy storage device 42 for further use, as indicated by arrow 58. As before, the weld power converter 46 and the auxiliary power converter 48 are directed by the control circuitry 52 to condition and output appropriate levels of power for the welding operation and the auxiliary operation, respectively.

Figure 5A:
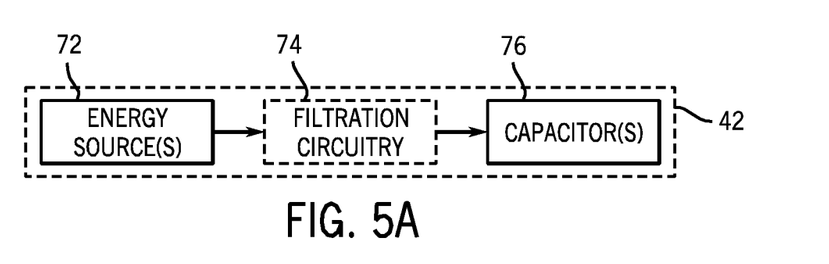
FIG. 5A is a block diagram illustrating an embodiment of an energy storage device including a capacitor that may be disposed within an embodiment of the hybrid welding device of FIG. 1.
Figure 5B:
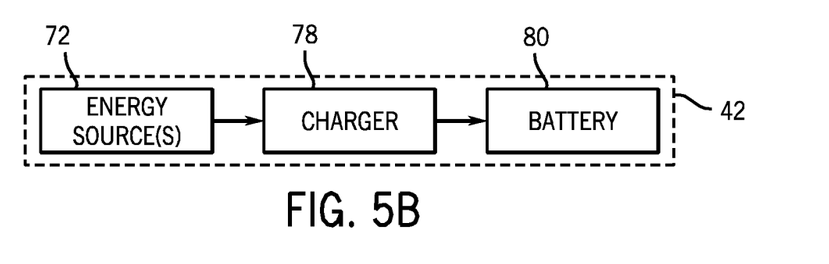
FIG. 5B is a block diagram illustrating an embodiment of an energy storage device including a battery that may be disposed within an embodiment of the hybrid welding device of FIG. 1.

FIGS. 5A and 5B illustrate exemplary embodiments of the energy storage device 42 of FIGS. 2-4. Specifically, the energy storage device 42 depicted in FIG. 5A includes one or more energy sources 72, filtration circuitry 74, and one or more capacitors 76. The energy sources 72 may be one or more of the fuel cell, the engine-generator unit, and the utility power or may be any other energy source that is routed to the power conversion circuitry via the energy storage device 42. Since the incoming power may be in a variety of incoming power conditions, the filtration circuitry may be desirable in some embodiments to convert the incoming power to a uniform type. For example, the filtration circuitry 74 may include an inductor configured to smooth the incoming power. The one or more capacitors 76 may be configured to selectively store and release energy based on the system demands and performance. For instance, when the level of the incoming power from the energy sources 72 exceeds the level of power needed by the welding system, the capacitors may be configured to store energy. However, when the level of incoming power falls below the level of power needed by the welding system, the capacitors 76 may be configured to release energy to supplement the incoming power. Similarly, FIG. 5B illustrates a further embodiment of the energy storage device 42 including the one or more energy sources 72, a charger 78, and a battery 80. In this embodiment, the charger 78 is configured to receive energy from one or more primary sources 72 and transfer such energy to the battery 80 to restore charge to the battery 80.

It should be noted that a variety of control and management systems may be coupled to the energy storage devices. For example, in one embodiment, a battery management system may be provided and configured to function as a warming system in cold climates. Such a management system may be used to warm the energy storage device to accelerate the chemical reactions necessary for the generation of power. Further, the management system may monitor the charge and remaining life of the energy storage device, amongst other maintenance and management information, such as amperage, voltage, and usage over time, and communicate such information to an operator via a warning light on the welding device, a cell phone network, the internet, and so forth.

Figure 6:
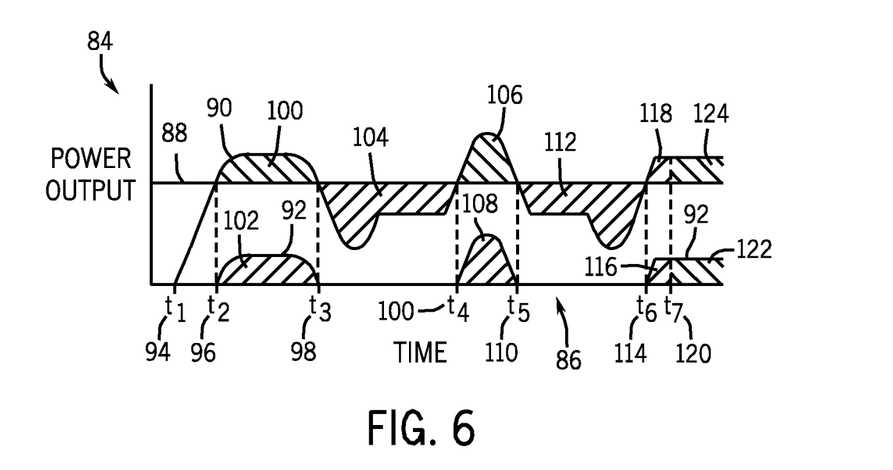
FIG. 6 is an exemplary power output versus time plot illustrating an exemplary mode of operation of an embodiment of the hybrid welding device of FIG. 1.

FIG. 6 is an exemplary power output versus time plot 82 illustrating an exemplary mode of operation of the hybrid power supply 12. That is, FIG. 6 illustrates one embodiment of how multiple fuel sources, (e.g., the fuel cell, the energy storage device, and the engine-generator unit) may cooperate to meet the power demand output of the hybrid welding system. Specifically, the plot 82 includes a power output axis 84 and a time axis 86. The plot 82 also includes a fuel cell output 88, a system power demand 90, and a supplemental power output 92. In the illustrated embodiment, the fuel cell output 88 remains relatively constant during the entire welding period. Such a feature may enable the fuel cell to efficiently function as the primary source of power for the welding and/or auxiliary operations, allowing the other sources to be used as needed. However, one or more supplemental sources (e.g., an energy storage device and/or an engine-generator unit) may supply power for the welding operation when the system power demand exceeds the level of the fuel cell output. Also, when the demand of the system falls below the level of the fuel cell output, the power output from the fuel cell may be used to recharge the energy storage device.

Specifically, in the illustrated embodiment, the welding system demands power at a first time 94. The fuel cell output 88 supplies the power demanded by the system until a second time 96. At time 96, the demand of the system exceeds the level of the fuel cell output 88 and continues to exceed the level of the fuel cell output 88 until a third time 98. That is, an energy deficit, as indicated by shaded area 100, exists between the fuel cell output being produced and the demand of the system. Accordingly, one or more supplemental sources, such as the energy storage device or the engine-generator unit, supply the additional power needed between time 96 and time 98, as indicated by shaded area 102. At time 98, the power demand of the system falls below the level of the fuel cell output 88, and the supplemental source output is no longer needed. Between time 98 and a fourth time 100, a difference between the fuel cell output 88 and the low power demand of the system generates excess energy, as indicated by shaded area 104, which may be utilized to recharge the supplemental energy source, such as a battery.

At the fourth time 100, the power demand of the system 90 once again exceeds the level of the fuel cell output 88, as indicated by shaded area 106. As such, the supplemental energy source (e.g., the energy storage device) supplies the necessary excess power, as indicated by area 108. At a fifth time 110, the power demand of the system 90 again falls below the fuel cell output 88, leading to an excess of power, as indicated by shaded area 112, which may be utilized to recharge the supplemental energy storage device. At a sixth time 114, the power demand of the system 90 again exceeds the power output of the fuel cell 88. Accordingly, in one embodiment, at the sixth time, the energy storage device may output power, as indicated by shaded area 116, to make up for the needed power, as indicated by shaded area 118. However, at a seventh time 120, the energy storage device becomes depleted of energy and can no longer support the demand of the system that exceeds the fuel cell output 88. Accordingly, an alternate power source, such as the engine-generator unit, becomes active at time 120 to provide the power needed by the system that exceeds the fuel cell output 88. That is, area 122 represents the power provided by the alternate power source to make up for the needed output represented by shaded area 124. By operating in such a way, the hybrid welding system may utilize multiple fuel sources to maximum system efficiency without compromising the power output needed by the system.

It should be noted that a variety of other control schemes and power output sequences may be employed by the hybrid welding system, and the illustrated embodiment is merely exemplary. For example, a power source other than the fuel cell may be utilized as the primary power source, providing a constant output, and the remaining sources may be utilized to make up the difference between the primary power source and the system power demand. Furthermore, the constant fuel cell output level may be set by an operator prior to the beginning of the welding operation and/or may be configured to be reset via operator input at any given time during the welding operation. As such, the non-primary power sources may be more or less active than in the illustrated embodiment. Indeed, any suitable control scheme that makes use of the multiple provided power sources may be employed in further embodiments.

In one alternate embodiment, the energy storage device may be configured to function as the sole source of power for an initial weld or auxiliary startup period. That is, while the fuel cell initiates and begins reacting the fuel source, the energy storage device may provide the necessary power. The fuel cell may take over functioning as the primary power source once initialization is over and the fuel cell is ready to handle a load. Still further, one or more sensors may be placed on or in the fuel cell to sense one or more relevant parameters, and the output of the fuel cell may be adjusted according to the sensed parameter levels. Furthermore, sensors, such as hydrogen sensors, may be employed in conjunction with the fuel cell to monitor for leakage.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A hybrid welding device, comprising:
   a fuel cell configured to consume a fuel source to generate a substantially constant power output for a welding operation;
   an energy storage device configured to discharge a supply of stored energy to provide power to supplement the fuel cell power output while a welding power output combined with an auxiliary power output exceeds the fuel cell power output and to be charged by the fuel cell power output while the combined welding power output and auxiliary power output level is below the fuel cell power output; and
   power conversion circuitry coupled to at least one of the fuel cell and the energy storage device and configured to receive the power from the fuel cell, to receive the power from the energy storage device, and to convert the received power to the welding power output and the auxiliary power output.

2. The hybrid welding device of claim 1, further comprising control circuitry configured to regulate a level of the fuel cell power output to a level set by an operator.

3. The hybrid welding device of claim 1, further comprising an engine driven by a generator to produce an engine power output to supplement the fuel cell power output while the welding power output combined with the auxiliary power output exceeds the fuel cell power output.

4. The hybrid welding device of claim 1, wherein the auxiliary power output comprises at least one of 120 volts, 200 volts, 240 volts, 400 volts, and 460 volts.

5. The hybrid welding device of claim 1, further comprising utility power configured to supplement the fuel cell power output while the welding power output combined with the auxiliary power output exceeds the fuel cell power output.

6. The hybrid welding device of claim 1, wherein the fuel cell is at least one of a hydrogen fuel cell, a reformation fuel cell, a proton exchange membrane fuel cell, a solid oxide fuel cell, a molten carbonate fuel cell, a regenerative fuel cell, an enzymatic biofuel cell, and a metal hydride fuel cell.

7. The hybrid welding device of claim 1, wherein the power conversion circuitry comprises a weld power converter configured to produce the welding power output and an auxiliary power converter configured to produce the auxiliary power output.

* * * * *